July 8, 1958
E. D. HAIGLER
2,841,985
COMPENSATING OR DIFFERENTIAL PRESSURE
OR TEMPERATURE RESPONSIVE MECHANISM
Filed Sept. 8, 1953
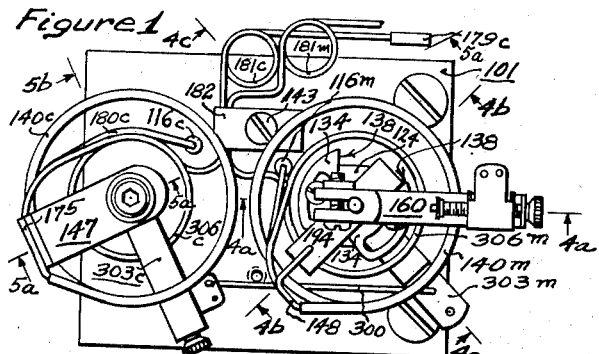
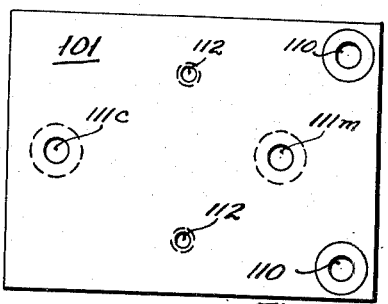
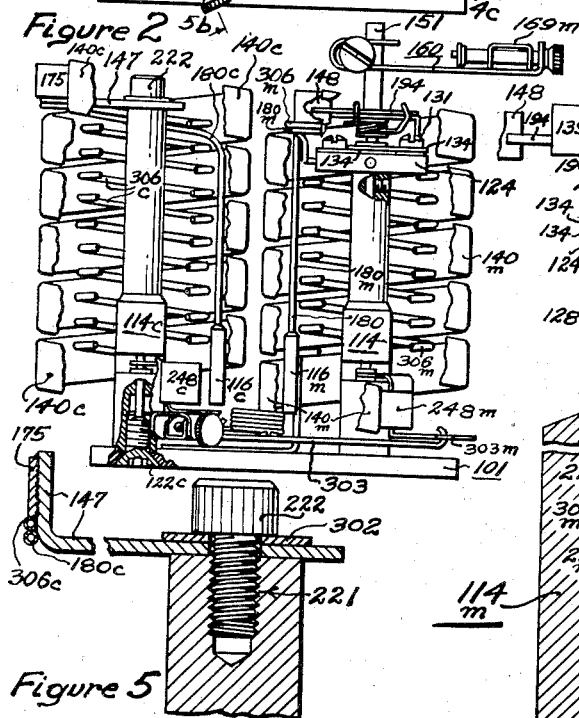
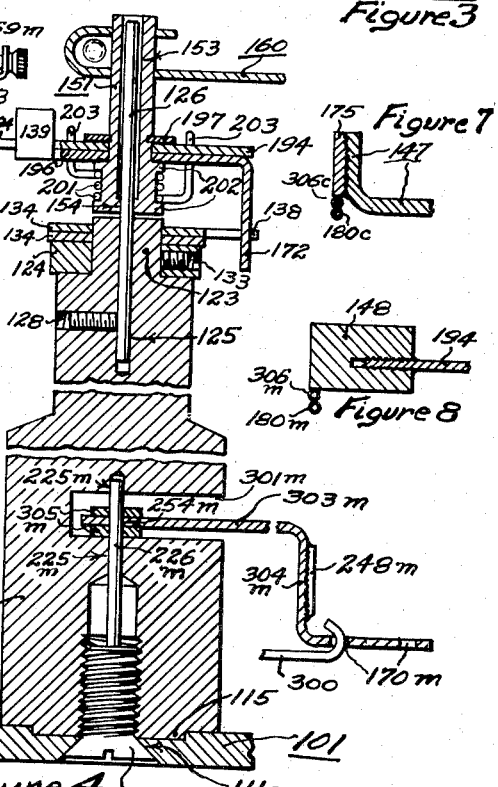
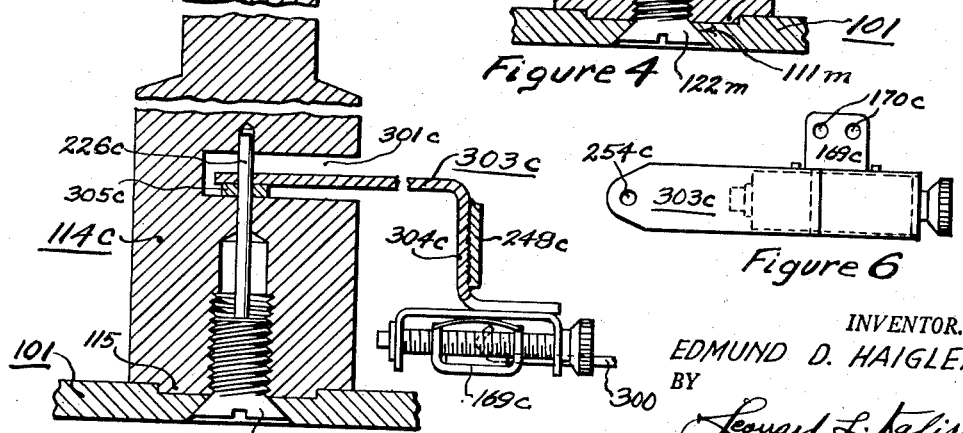
INVENTOR.
EDMUND D. HAIGLER
BY
Leonard L. Kalish
HIS ATTORNEY.

United States Patent Office 2,841,985
Patented July 8, 1958

2,841,985

COMPENSATING OR DIFFERENTIAL PRESSURE OR TEMPERATURE RESPONSIVE MECHANISM

Edmund D. Haigler, Hatboro, Pa., assignor to Fischer & Porter Company, Hatboro, Pa., a corporation of Pennsylvania Application September 8, 1953, Serial No. 378,945

4 Claims. (Cl. 73—412)

This invention relates to a compensating or differential pressure (or temperature) responsive mechanism.

It is an object of this invention to provide a double-Bourdon-spring mechanism which may use two generally identical Bourdon-springs, that is, wound in the same direction, to make differential or additive measurements. It is a further object of this invention to provide a double-Bourdon-spring mechanism in which long overhangs of levers connecting from the top of one Bourdon-spring to the bottom of the other, are avoided.

It is a further object of this invention to provide a double Bourdon-spring mounting of low friction, in that essentially single-point pivots are used both for low friction and to avoid the need for precision in the axial and angular alignments.

It is another object of this invention to provide these characteristics in a Bourdon tube mounting interchangeable with the single Bourdon mounting of my co-pending application Serial No. 378,943 filed of even date herewith.

It is also an object of this invention to utilize the same over-range stops, the same Bourdon tubes and many other parts in common to the mechanism hereof and the mechanism of my co-pending application Serial No. 378,943.

For the purpose of illustrating the present invention, there are shown in the accompanying drawings a form thereof which is at present preferred, although it is to be understood that the various instrumentalities of which the invention consists can be variously arranged and organized and that the invention is not limited to the precise arrangements and organizations of the instrumentalities as herein shown and described.

The figures of the drawings, wherein like reference-numerals indicate like parts, are as follows:

Figure 1 represents a plan view of a double-spring-Bourdon mechanism illustrating one embodiment of the present invention.

Figure 2 represents a side elevation of the same mechanism, partly in section.

Figure 3 represents a plan view of the base.

Figure 4 represents a cross-sectional view, on an enlarged scale, of the right post assembly or measurement post assembly, which is disposed within the measuring Bourdon spring 140m, the uppermost or output-lever (160) portion of which is taken on line 4a—4a of Figure 1, the next portion of which (namely, through the over-travel mechanism and stop-mechanism) is taken on line 4b—4b of Figure 1, while the lower portion of which is taken on line 4c—4c of Figure 1.

Figure 5 represents a similar cross-sectional view, on an enlarged scale, of the left post assembly or compensating post assembly which is within the compensating Bourdon spring 140c, the upper portion of which is taken on line 5a—5a of Figure 1 and the lower portion of which is taken on line 5b—5b of Figure 1.

Figure 6 represents a plan view of the lower pivoted arm 303c (with its micrometer slide) of the compensating assembly shown in Figure 5 and on the left side of Figures 1 and 2.

Figure 7 represents a section on line 5a—5a of Figure 1, of the connection, to the compensating Bourdon-spring 140c, of the upper stationary anchorage arm 147 and the two capillary tubes 306c and 180c which enter said Bourdon spring at its upper end.

Figure 8 represents a section on line 4b—4b of Figure 1, showing the connection between the upper end of the measuring Bourdon spring 140m and the movable arm 194 at the top of the post shown in Figure 4, and including the two capillary tubes 306m and 180m which are connected to the upper end of the Bourdon tube 140m.

Many of the parts of the compensating or differential pressure or temperature measuring mechanism of the present application are also shown and described in co-pending application Serial No. 378,943 covering single-Bourdon-spring mountings and mechanisms.

The base 101 (Figure 3) is provided with countersunk holes 110, through which mounting-screws (shown in Figure 1) may be extended, for mounting the mechanism on an instrument panel or on an instrument case. The base 101 also includes holes 111m and 111c, each countersunk from beneath or on the under-side of the base 101, for receiving the screws 122m and 122c, respectively, by which the posts 114m and 114c are mounted on the base 101, as indicated more particularly in Figures 2, 4 and 5.

Throughout this description, where a similar part, element or component is provided both in or for the measurement-spring assembly as well as in or for the compensating-spring assembly, the two elements are designated by the same reference-numeral; differentiated by the suffix-letters "m" and "c," respectively, "m" referring to the measurement side and "c" to the compensating side of the mechanism. This use of the same reference-numerals, differentiated by letters "m" and "c," is also used where the parts are not identical but similar and perform somewhat similar functions, as, for instance, the posts 114m and 114c. Moreover, where the same descriptive matter applies equally to both "m" suffixed part and the "c" suffixed part, the reference-numeral is used without either suffix; and such use is intended to cover both the "m" suffixed and the "c" suffixed part bearing that reference-numeral.

The lower ends of the posts 114 are preferably slightly reduced in diameter, for a short distance, as at 115, and such reduced ends 115 are recessed into the base 101, as indicated particularly in Figures 4 and 5, so to obtain firmer anchorage and rigidly between the base and said posts.

The upper end of the post 114m is reduced in diameter as at 123, and on this reduced-diameter portion the stop-supporting member 124 shown particularly in Figures 11 and 13 of co-pending application Serial No. 378,943 and also shown in Figures 1, 2 and 4 of the present application, is mounted, and secured in place by the set-screw 133. To this stop-supporting member 124, the stop-members 134 are adjustably secured (in anguar respect), by the set-screws 131, so as to bring the stop-edges 138 (Figures 1 and 4) at the proper distance from each other, according to the pointer-travel desired or according to the travel desired for the output-arm 160 of the mechanism.

A pivot pin 126 is mounted on top of the post 114m, coaxially therewith, by being set into an axial hole 125 therein, and secured therein by the set-screw 128. Upon the pivot-pin 126, a tubular bearing assembly 151 is telescopically mounted as indicated particularly in Figures 2 and 4; said tubular bearing assembly member 151 having its inner bore 153 slightly larger than the outer diameter of the pivot-pin 126, so that it clears the pivot pin at all times except when it is slightly cocked. When slightly cocked, the upper end of the pin 126 will engage the inner bore 153 of the tube 151 to limit the cocking. The lower end of the tubular bearing member 151 is enlarged, as indicated particularly in Figure 4, to form a spool-like lower portion including flanges 202 (Figure 4) between which the coils of the spring 201 are disposed. In the lowermost portion of the tubular member 151, a short bearing 154 is provided, journaled on the pin 126, as indicated in Figure 4.

The driven lever or arm 196, having an up-turned coupling-lug 139 and a down-turned stop-finger 172, is mounted on the tubular member 151, against the upper flange 202, and is soldered, brazed or otherwise affixed thereto. The stop-finger 172 extends down, between the two stop-edges 138 of the two angularly adjustable stop members 134, so as to limit the angular motion of the tubular bearing-assembly member 151 and of the output-arm 160 secured thereto.

Superimposed upon the driven-lever 196, is the driving-lever 194 journaled on the outer surface of the tubular member 151, as indicated particularly in Figure 4, and is retained, against axial displacement, by the split locking-spring washer 197 engaging in an annular groove in the tubular member 151, as indicated in Figure 4. To the left end of the driving-lever 194 the Bourdon-tube-tip 148 is secured, by soldering, or the like (Figures 1, 2, 4 and 8).

The coupling-member 139 is so disposed that when the Bourdon spring 140m expands, the end of the lever 194 which is juxtaposed to the coupling member 139 will move in a direction away from the coupling member 139. The spring 201, having hooked ends 203 engaging opposite ends of the driving-lever 194 and of the driven-lever 196, as shown in Figures 2 and 4 (and also in Figures 15 to 20, inclusive, of co-pending application Serial No. 378,943), forms a resilient driving connection between the driving-lever 194 and the driven-lever 196, through which the upper or output end of the measuring Bourdon spring 140m yiedably drives the driven-lever 196 and hence the tubular bearing member 151 and output arm 160 secured thereto, when said Bourdon spring 140m expands. The driven-lever 196, bearing member 151, and output arm 160 come to a stop however when the stop-arm 172 meets the stop-edge 138 (Figure 4), while the driving-lever 194 and the upper output end of the Bourdon spring 140m can travel further or over-travel, because of the resilient connection between the driving and driven members provided by the spring 201.

The output-arm 160, its securement to the tubular bearing-member 151, and the micrometer slide 169 thereon, are the same as the corresponding elements in co-pending application Serial No. 378,943.

Into the upper end of the Bourdon spring 140m, preferably immediately below the portion of the tip 148 which is inserted into the end of the spring 140m, the two capillary tubes 306m and 180m are inserted and soldered in place, to form fluid connection with the interior thereof. The capillary tube 306m extends from beneath the tip 148 in a spiral coil (also designated as 306m in Figures 1 and 2), and is finally fastened beneath the clip 182 held by screw 143 (Figure 1), and then, through a reserve-length coil 181m, this capillary is extended to and connected with the measuring bulb or other fluid-filled temperature-sensing or pressure-sensing element (not shown) located at the point of measurement. The capillary 180m extends from the top of the Bourdon-spring 140m, downwardly (within said spring), as indicated particularly in Figures 1 and 2, and terminates near the bottom of the spring 140m in a coupling-sleeve or closure-sleeve 116m as indicated in Figures 1 and 2, the outer end of which is closed in normal operation, but which may be opened to fill the Bourdon-spring 140m and its associated bulb or other measurement-sensing element or to adjust the setting thereof by varying the fluid content thereof. The lower end of the Bourdon-spring 140m is closed by the tip or anchorage member 248m, which is telescoped into and soldered into, in sealed relation, in the lower end of the Bourdon-spring 140m. The outer or free end of the tip 248m is then soldered or otherwise affixed to the vertical portion 304m of the pivotal Bourdon-supporting arm 303m shown in Figures 1, 2 and 4. The inner horizonal portion of the Bourdon-supporting arm 303m is provided with a journal-hole 254m at its inner end, which extends into a slot 301m in the post 114m, where it is pivoted or journaled on the pivot-pin 226m, which pin is fitted neatly into the aligned holes 225m and is held therein by having its outer end abutting the inner end of the post-securing screw 122m (as shown particularly in Figure 4). A pair of thrust-washers 305m are placed on the pin 226m below and above the pivoted end of the Bourdon-supporting arm 303m, so as to reduce the contact-area between the pivoted end of the arm 303m and the sides of the slot 301m. The slot 301m is made wide enough, so that the arm 303m can adjust itself, in an axial direction. If the mechanism is mounted in the instrument-case or on the instrument-panel with the two axes of the posts 114 disposed vertically, then the Bourdon-supporting arm 303m will rest on the lower washer 305m (Figure 4), while if the mechanism is mounted with said post-axes disposed horizontally, then the arm 303m may float so that neither washer 305m bears against the side wall of the slot 301m, or the upper washer 305m may bear against the upper side of the slot 301m.

The proportions and adjustments are so made that when the arm 303m rests on the lower washer 305m, then the lowermost end of the bearing member 151 will still be just short of contacting the top of the reduced-diameter portion 123 of the post 114m, so that the bearing member 151 will still be floated, axially, while deriving its radial support through the short bearing 154.

The compensating Bourdon-spring 140c derives its main support by having its fixed anchorage member or tip 175 secured to the upper stationary Bourdon-supporting arm 147 fixed to the upper end of the post 114c, as indicated in Figures 1, 2 and 5. Thus, the Bourdon-tip 175 is soldered into the upper end of the compensating Bourdon-spring 140c, along with the capillary tubes 306c and 180c, as indicated in Figures 1, 2, 5 and 7. The capillary tube 306c extends downwardly from the upper end of the Bourdon-spring 140c, in the spiral 306c shown particularly in Figures 1 and 2, and finally extends beneath the clip 183 and, through the spare-length coil 181c thereof, to the sleeve 179c through which it is closed off or through which it may be connected to the compensating bulb or to a suitable length of compensated capillary tubing. Thus, the capillary tube 306c is of a length such that it will provide adequate compensation for changes of temperature within the instrument-case or the temperature of the air around the instrument-panel. If desired to compensate for changes in temperature along the path of travel of the capillary tube 306m which leads from the measuring Bourdon-spring 140m to the remotely-located sensing element, then the capillary tube 306c may be extended along this path, generally alongside of the capillary 306m, and then closed off just short of the point of measurement or the zone of measurement. In this manner changes in temperature outside the point of measurement may be compensated for. Moreover, if desired, temperature-differences or pressure-differences may in like manner be indicated by the mechanism of the present invention, by providing a bulb or other temperature-sensing or pressure-sensing fluid-filled element at the end of the capillary 306c, located at a second point of measurement (different from the point of measurement to which the capillary 306m extends), and in this manner the mechanism of the present invention may be used to indicate, through the output-arm 160 thereof, the difference between or the summation of the two measurements; according to the manner in which the lower ends of the two Bourdon-springs (140m and 140c) are connected through the arms 303c and 303m, by means of the connecting-rod or link 300, namely, whether they are additively connected or subtractively connected.

The capillary 180c extends down from the top of the Bourdon-spring 140c, in a manner similar to the capillary 180m, above referred to, and is used for the same purposes.

The mounting-hole in the stationary arm 147, through which the mounting-screw 222 extends, is preferably made oversize in relation to the mounting-screw 222, so that the arm 147 can be laterally adjusted so as generally to place the Bourdon spring 140c in coaxial relation to the upper end of the post 114c. A washer 302 beneath the head of the screw 222 serves more firmly to clamp the arm 147 in its adjusted position when the screw 222 is tightened in the tapped hole 221 which extends down into the post 114c, axially.

The lower end of the Bourdon-spring 140c has the tip or anchorage member 248c extended thereinto and soldered in place, to close this end of the Bourdon-spring. The outer projecting or free end of the anchorage member or tip 248c is soldered to the vertical or off-setting portion 304c of the Bourdon-supporting pivot-arm 303c, as indicated in Figures 2 and 5. The inner end of the Bourdon-supporting arm 303c (Figures 5 and 6) has a journal-hole 254c and extends into the slot 301c and is journaled on the pivot-pin 226c, in a manner similar to the corresponding portions of the measurement-assembly. The single thrust-bearing washer 305c is sufficient here (Figure 5) because the Bourdon spring 140c is supported from above, on the stationary arm 147, and is so adjusted that it does not ever contact the upper side-wall of the slot 301c, and may even float clear of the washer 305c.

To the lower, outer, horizontal portion of the Bourdon-pivoting arm 303c, a micrometer adjusting mechanism is secured, by soldering or otherwise, similar to the micrometer arrangement on the output-arm 160, having a slider 169c with a pair of alternate link-pivot holes 170c, into one of which the pivotal end of the link or connecting rod 300 is operatively connected. The other end of the same link 300 is correspondingly connected into one of the pivot-holes 170m of the arm 303m (Figures 1, 2, 5 and 4).

By the connection indicated in Figures 1 and 2, the two Bourdon-springs 140c and 140m are subtractively connected. Thus, with the two Bourdon-springs wound in the same direction, any expansion of the Bourdon-spring 140c will move the lower or reference-end of the Bourdon-spring 140m in such a direction as to decrease the "reading" or measurement-indication supplied by the upper end of the Bourdon spring 140m to the output-arm 160.

By turning one or the other of the posts, 114c or 114m, 180° (about its axis), and so fastening it to the base 101, and then placing the corresponding Bourdon-pivoting arm 303 also 180° about the axis of the post, and then re-connecting the two arms 303 through the link 300, which will now extend diagonally between the two post-axes, the two Bourdon springs will be connected additively. Such a reversal of effect of the tube 140c upon the base-reference-position of the lower end of the Bourdon spring 140m, can also be effected by winding one or the other of the Bourdon springs in the opposite direction from the other. However, using identically wound springs, it is only necessary that the line of the link 300 not pass between the post-axes for subtractive connection or that it pass between the axes for an additive connection.

In this manner, the mechanism of the present invention may be used to indicate the sum of the two measurements or the difference of the two measurements (of either temperature pressure). To effect the summation of the two measurements, the expansive movements of the two Bourdon springs are connected to apply their motions in the same directions so that both their motions will operate in the same direction upon the output-arm 160. To effect the subtraction of one measurement from the other, they are connected so that the expansive-motion of one spring is subtracted from the expansive-motion of the other spring (as shown in Figures 1 and 2).

Similarly, the sum of or the difference between one Bourdon-motion proportional to pressure and one Bourdon-motion proportional to temperature, may be measured by the mechanism of the present invention, by connecting one Bourdon-spring 140 to a pressure-sensing element (through its capillary tube 306) and connecting the other Bourdon-spring 140 through a temperature-sensing element (through its capillary tube 306), with or without a bi-metal compensator intervening one end of the temperature-responsive Bourdon spring and its corresponding anchorage or support (in the manner shown and described in copending application Serial No. 378,943).

If desired, instead of having one end of one of the Bourdon springs 140, as, for instance, the upper end of the Bourdon spring 140c, stationarily fixed (as hereinabove indicated), this end may likewise be pivotally mounted, and connected to the measurement-motion of another measurement-mechanism, so that the measurement-motion supplied by such other measurement-mechanism will pass through both Bourdon springs 140c and 140m, so that a composite measurement is delivered to the output-arm 160 which represents the motions imparted by the two Bourdon springs 140c and 140m (additively or subtractively) superimposed upon the measurement-motion of such other measurement-mechanism, which is put into the upper end of the Bourdon spring 140c.

Where both ends of both Bourdon springs 140c and 140m are pivotally mounted and are "floated," it is desirable to supply flexure-springs on the ends of the connecting-link 300, or to form the link 300 as a single flexure-strip pivotally connected to holes 170c and 170m, so as to get a more accurate connection and to eliminate any back-lash; the ends of such flexure-strip being pivotally connected to the holes 170c and 170m by neat-fitting pivots. The flexure-strip permits vertical or axial motions between the ends of the two Bourdon springs which are so connected by such flexure-strip.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described the invention, the following is claimed:

1. A multiple Bourdon mechanism, including a base, a pair of stationary Bourdon-supporting posts extending from said base, a helical Bourdon tube disposed about one of said posts with one end thereof fixedly secured thereto, an angularly displaceable anchorage for the other end of said tube pivotally mounted on said post at a point therealong in close proximity to the plane in which the other end of said Bourdon tube lies, said angularly displaceable anchorage member having its axis of pivotation substantially in the axis of said Bourdon tube, another helical Bourdon tube disposed about the other post with each of its ends movably mounted by being secured to corresponding angularly displaceable anchorage members pivotally mounted upon said post with their axes of pivotation coincidental with each other and with the axis of said Bourdon tube, said Bourdon tube having one of its ends in operative juxtaposition to the movable end of said first-mentioned Bourdon tube, means interconnecting the movable end of said first-mentioned Bourdon tube with the juxtaposed end of said last-mentioned Bourdon tube, thereby to set the so-connected end of said last-mentioned Bourdon tube by the response of said first-mentioned Bourdon tube, and an indicator connected with the other movable end of said last-mentioned Bourdon tube.

2. A multiple Bourdon mechanism, including a helical Bourdon tube having each of its two ends movably mounted and arranged to move in an arcuate path generally about the same axis, a separate radial anchorage member for each of said ends, to which said ends are affixed, respectively, each of said anchorage members being pivoted co-axially in relation to each other, with the point of pivotation of each being in close proximity to the plane of the end of the Bourdon tube affixed thereto, a second helical Bourdon tube having its axis generally parallel to and spaced from the axis of the first-mentioned Bourdon tube and having one end thereof stationarily anchored and having its other end in juxtaposition to one of the ends of the first-mentioned Bourdon tube affixed to a pivoted anchorage member whose axis is generally coincident with the axis of said last-mentioned Bourdon tube, and means interconnecting the free end of said last-mentioned Bourdon tube with the juxtaposed free end of said first-mentioned Bourdon tube, both connected ends of said interconnecting means being generally in the same plane and in close proximity to the connected ends of said two Bourdon tubes.

3. A multiple Bourdon tube mechanism, including two helical Bourdon tubes with their axes spaced apart in a direction transversely thereof, one of said Bourdon tubes having each of its two ends movably mounted and arranged to move in an arcuate path generally about the axis thereof, and a separate radial anchorage member for each of said ends of said tube, to which of said tube-ends, respectively, are affixed, each of said anchorage members being pivoted generally co-axially in relation to each other and to said Bourdon tube, the other of said Bourdon tubes having at least one of its ends movably mounted and arranged to move in an arcuate path generally about the axis thereof, a radial anchorage member for said movable end of said last-mentioned Bourdon tube, to which said tube-end is affixed, said last-mentioned anchorage member being pivoted generally co-axially in relation to said last-mentioned Bourdon tube, said movably mounted end of said last-mentioned Bourdon tube being disposed in operative juxtaposition to one of the ends of said first-mentioned Bourdon tube, and means interconnecting said juxtaposed movable ends of said two Bourdon tubes, whereby a movement of said movable end of said last-mentioned Bourdon tube determines the setting for said juxtaposed connected end of said first-mentioned Bourdon tube.

4. A helical Bourdon tube mechanism, including a helical Bourdon tube, a stationary pivot member disposed within the helix of said Bourdon tube and having two pivots generally co-axial with the helix of said tube, one of said pivots being in juxtaposition to one of the ends of said tube and the other pivot being in juxtaposition to the other end of said tube, a generally radial tube-anchorage member pivoted on one of said pivots and having the juxtaposed end of said Bourdon tube affixed thereto, a generally radial tube-anchorage member pivoted on the other of said pivots and having the juxtaposed end of said tube affixed thereto, said tube-ends being arranged to be movable in arcuate paths generally about the axis of said helical Bourdon tube.

References Cited in the file of this patent

UNITED STATES PATENTS

| 1,188,615 | Goodyear et al. | June 27, 1916 |
| 1,307,037 | Bristol | June 17, 1919 |
| 2,375,300 | Hubbard et al. | May 8, 1945 |